(12) United States Patent
Muranaka

(10) Patent No.: US 9,909,637 B2
(45) Date of Patent: Mar. 6, 2018

(54) DAMPER DEVICE

(71) Applicant: NIFCO INC., Yokosuka-shi, Kanagawa (JP)

(72) Inventor: Makoto Muranaka, Yokosuka (JP)

(73) Assignee: NIFCO INC., Yokosuka-Shi, Kanagawa (JP)

( * ) Notice: Subject to any disclaimer, the term of this patent is extended or adjusted under 35 U.S.C. 154(b) by 0 days.

(21) Appl. No.: 15/115,786

(22) PCT Filed: Jan. 28, 2015

(86) PCT No.: PCT/JP2015/052368
§ 371 (c)(1),
(2) Date: Aug. 1, 2016

(87) PCT Pub. No.: WO2015/115487
PCT Pub. Date: Aug. 6, 2015

(65) Prior Publication Data
US 2017/0009838 A1    Jan. 12, 2017

(30) Foreign Application Priority Data
Feb. 3, 2014    (JP) .................................. 2014-018924

(51) Int. Cl.
*F16D 57/02*    (2006.01)
*F16F 9/12*    (2006.01)
*F16F 9/36*    (2006.01)

(52) U.S. Cl.
CPC ................ *F16F 9/12* (2013.01); *F16F 9/369* (2013.01); *F16F 2230/30* (2013.01)

(58) Field of Classification Search
CPC .. F16F 9/12; F16F 9/369; F16F 13/106; F16F 2230/30; F16F 9/36; E05Y 2201/21
(Continued)

(56) References Cited

U.S. PATENT DOCUMENTS 4,513,473 A    4/1985    Omata
4,796,733 A    1/1989    Nakayama
(Continued)

FOREIGN PATENT DOCUMENTS

CN    202876982 U    4/2013
CN    203384365 U    1/2014
(Continued)

OTHER PUBLICATIONS

China Patent Office, "Office Action for Chinese Patent Application No. 201580007077.4," dated Apr. 24, 2017.
(Continued)

*Primary Examiner* — Anna M Momper
*Assistant Examiner* — Mahbubur Rashid
(74) *Attorney, Agent, or Firm* — Manabu Kanesaka

(57) ABSTRACT

A damper device includes a stator, a rotor, and a viscous fluid imparting a resistance to a rotation or a relative rotation of the rotor, and forms a braking force by the resistance. In the rotor, an annular seal portion made of soft synthetic resin is provided by integral molding. The stator includes an annular space in which the viscous fluid is filled, and a main member portion of the rotor is housed in the annular space. The annular seal portion comprises an outside annular portion provided in an outer circumferential portion of the rotor; an inside annular portion provided in an inner circumferential portion of the rotor; and a connection portion therebetween.

5 Claims, 8 Drawing Sheets

(58) Field of Classification Search
USPC .................................................. 188/293
See application file for complete search history.

(56) References Cited

U.S. PATENT DOCUMENTS

| | | | | |
|---|---|---|---|---|
| 4,867,926 | A * | 9/1989 | Matsushima | B29C 43/18 264/127 |
| 5,497,863 | A | 3/1996 | Schmidt et al. | |
| 6,604,614 | B2 * | 8/2003 | Kurihara | B60N 3/023 188/290 |
| 6,662,683 | B1 * | 12/2003 | Takahashi | B60N 3/023 188/290 |
| 6,866,588 | B2 * | 3/2005 | Doornbos | E05F 5/10 192/12 BA |
| 8,127,902 | B2 * | 3/2012 | Pasino | F16F 9/36 188/322.16 |
| 2003/0178269 | A1 * | 9/2003 | Hayashi | B60G 13/003 188/321.11 |
| 2007/0241515 | A1 * | 10/2007 | Sato | F16F 9/36 277/549 |
| 2008/0100002 | A1 * | 5/2008 | Minamino | F15B 15/1433 277/456 |
| 2010/0282553 | A1 | 11/2010 | Cultraro | |
| 2013/0306417 | A1 * | 11/2013 | Ono | F16J 15/18 188/290 |

FOREIGN PATENT DOCUMENTS

| | | | |
|---|---|---|---|
| EP | 1933058 A2 | 6/2008 | |
| GB | 2288450 A | 10/1995 | |
| JP | S59-100128 U | 7/1984 | |
| JP | S63-043039 A | 2/1988 | |
| JP | H07-083263 A | 3/1995 | |
| JP | 4602620 B2 | 12/2010 | |
| KR | 20010049873 A | 6/2001 | |
| SU | 1634862 A2 * | 3/1991 | ............... F16F 9/10 |
| WO | WO 2013065505 A1 * | 5/2013 | ............... F16F 9/36 |

OTHER PUBLICATIONS

PCT International Search Report of PCT/JP2015/052368.
Europe Patent Office, "Search Report for European Patent Application No. 15743555.3," dated Nov. 3, 2017.

* cited by examiner

DAMPER DEVICE

FIELD OF TECHNOLOGY

The present invention relates to an improvement of a damper device.

BACKGROUND ART

There is a damper device called, i.e. a rotary damper and the like, comprising a rotor (rotation-side member); a stator (fixed-side member, a housing in a prior art document); and a viscous fluid filled therebetween, and formed such that a resistance of the viscous fluid relative to a rotation or a relative rotation of the rotor becomes a braking force (see Patent Document 1).

In the damper device of the Patent Document 1, the housing has a structure wherein the rotor can be housed in an annular space formed between an outer cylinder and an inner cylinder. In the damper device of the Patent Document 1, the rotor has a cylinder shape wherein both cylinder ends are open, and the inner cylinder of the housing opens both cylinder ends as well. Consequently, the damper device of the Patent Document 1 prevents leakage of the viscous fluid between the rotor and stator by two seal members of an annular first seal member mounted outside the rotor, and an annular second seal member mounted inside the rotor.

Therefore, in the damper device of the Patent Document 1, when the rotor and the stator are assembled, the first seal member is fitted to an outside of the rotor in such a way as to pass the rotor through the inside while elastically expanding the first seal member, and from a state wherein the second seal member is housed inside the rotor, it is necessary to house the rotor inside the annular space of the stator. In such an assembly, it is required to pay special attention to a positional misalignment, a dropout, or the like of any of the seal members. In the assembly, in a case wherein a position of any of the seal members is misaligned, or a twist or the like is generated in any of the seal members, there occur inconveniences such that a sealing property of the viscous fluid becomes insufficient, and the damper device does not exert an expected braking force, and the like.

PRIOR ART DOCUMENT

Patent Document

Patent Document 1: Japanese Patent No. 4602620

SUMMARY OF THE INVENTION

Problems to be Solved by the Invention

In this kind of damper device, a main object of the present invention is to provide a damper device wherein seal members preventing the leakage of the viscous fluid are provided respectively inside and outside the rotor forming such damper device so that an assembly to the stator can be easily performed, and at the assembly time, the positional misalignment, the twist, or the like of the seal members does not occur.

Means for Solving the Problems

In order to obtain the aforementioned object, in the present invention, a damper device comprises a stator, a rotor, and a viscous fluid filled therebetween for imparting a resistance to a rotation or a relative rotation of the rotor, to form a braking force by the resistance. The rotor is provided with an annular seal portion made of soft synthetic resin by integral molding. The stator includes an annular space in which the viscous fluid is filled, and a main member portion of the rotor is housed in the annular space. The annular seal portion has a structure including an outside annular portion provided in an outer circumferential portion of the rotor; an inside annular portion provided in an inner circumferential portion of the rotor; and a connection portion therebetween.

In such damper device according to the present invention, the inside annular portion can seal between the stator and the inner circumferential portion of the rotor, and the outside annular portion can seal between the stator and the outer circumferential portion of the rotor. Such inside annular portion and outside annular portion are integrated by the connection portion, so that at a time of an assembly of the stator and the rotor, such assembly can be smoothly performed without twisting or misaligning the inside annular portion and the outside annular portion. Also, the annular seal portion is integrated with the rotor to become one portion thereof, so that the number of components of the damper device is minimized. Also, when the damper device is assembled, there is no need for a set of the annular seal portions.

One of preferred aspects is that the connection portion is formed inside a through hole passing through the inside and the outside of the rotor.

Also, one of the preferred aspects is that in an inside circumferential wall portion facing the inner circumferential portion of the rotor forming the annular space of the stator, there is formed an annular projecting portion abutting against the inside annular portion of the annular seal portion at a position forming the connection portion.

Effect of the Invention

According to the present invention, in this kind of damper device, seal members preventing leakage of the viscous fluid can be provided respectively inside and outside the rotor forming such damper device in aspects wherein the assembly to the stator can be easily performed, and at the assembly time, a positional misalignment, a twist, or the like of the seal members does not occur.

BEST MODES OF CARRYING OUT THE INVENTION

Hereinafter, based on FIG. 1 to FIG. 15, a typical embodiment of the present invention will be explained. A damper device according to the embodiment comprises a stator 1; a rotor 2; and a viscous fluid filled therebetween for imparting a resistance to a rotation or a relative rotation of the rotor 2, to make the resistance a braking force, and is called, i.e. a rotary damper and the like. Typically, such stator 1 and rotor 2 are formed by a synthetic resin material.

Figure 1:
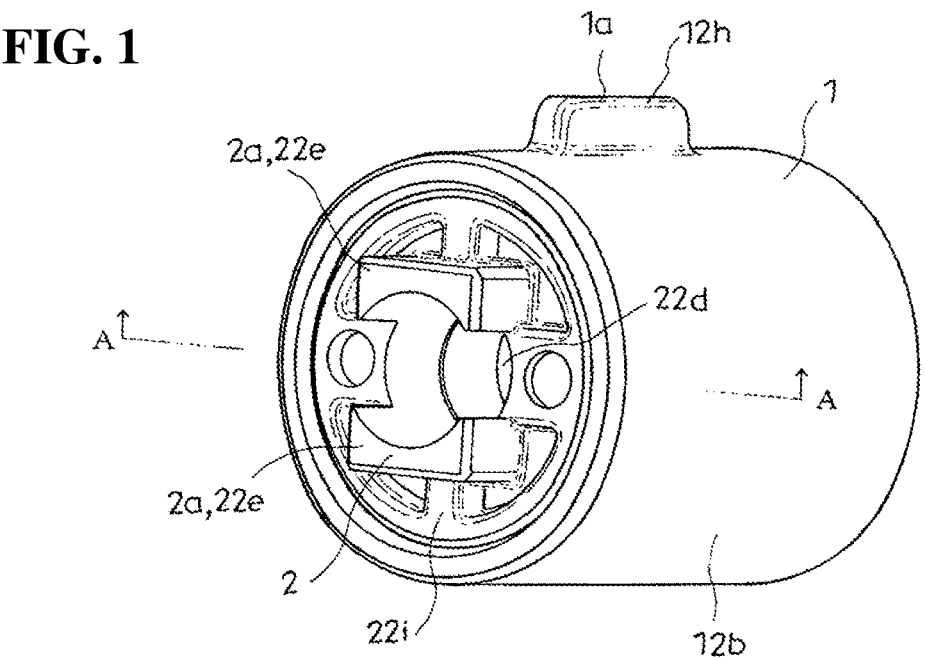
FIG. 1 is a perspective view of a damper device according to one embodiment of the present invention.
Figure 2:
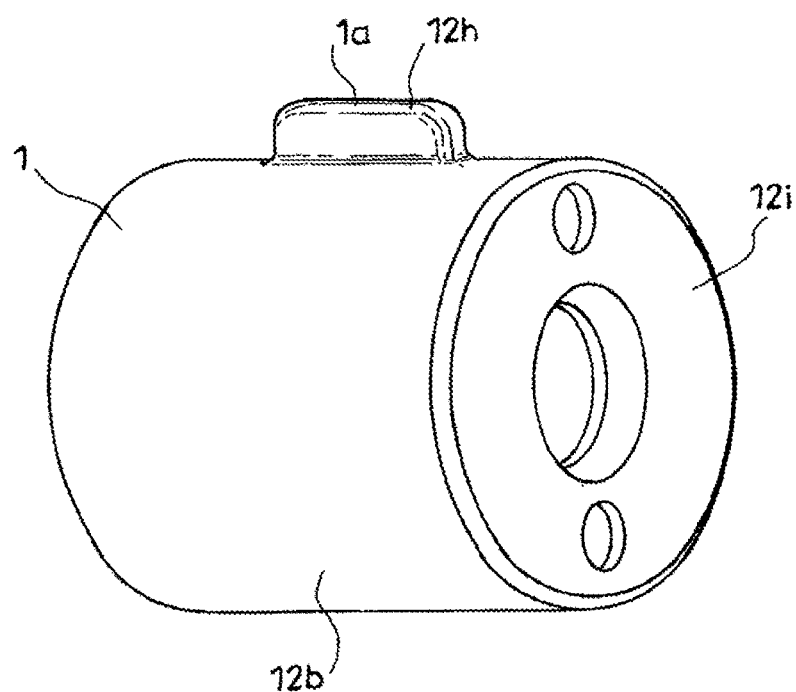
FIG. 2 is a perspective view of the damper device.

The rotor 2 is provided with an attachment portion 2a relative to one object (not shown in the drawings), and the stator 1 is provided with an attachment portion 1a relative to the other object (not shown in the drawings), respectively (see FIG. 1). Then, in such damper device, when the rotor 2 rotates or relatively rotates by moving or relatively moving one object, the damper device is used such that a constant braking force caused by the resistance of the viscous fluid is exerted for moving or relatively moving such one object.

Figure 5:
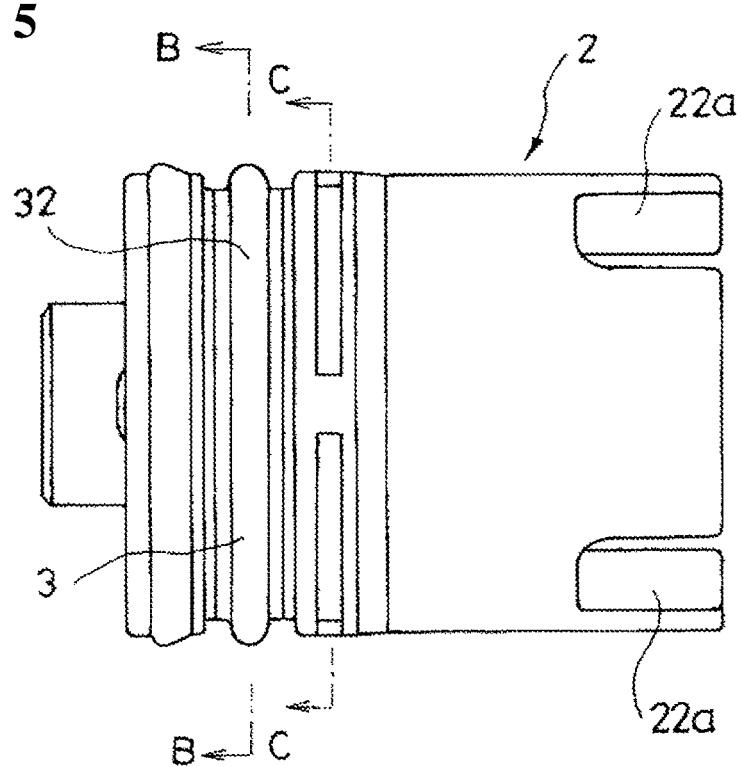
FIG. 5 is a front view of a rotor forming the damper device.
Figure 6:
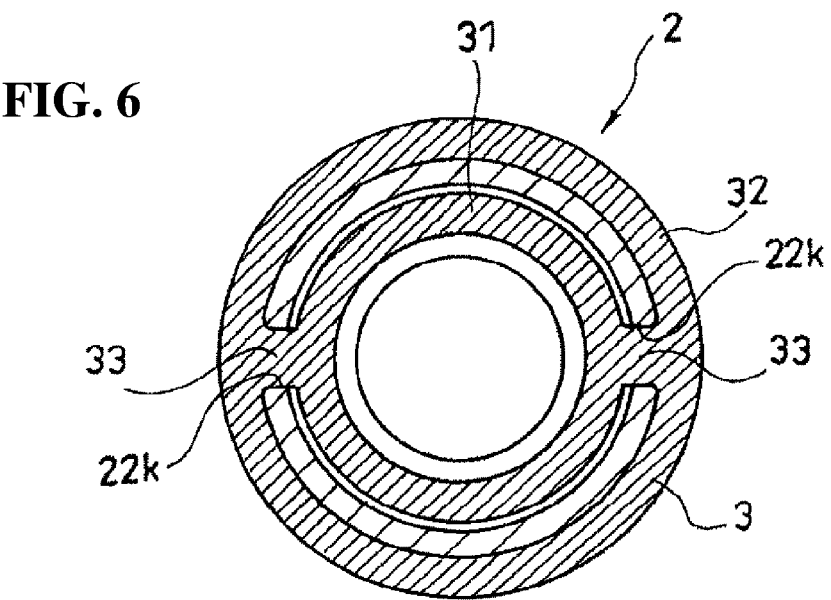
FIG. 6 is a cross-sectional view taken along a line B-B in FIG. 5.
Figure 7:
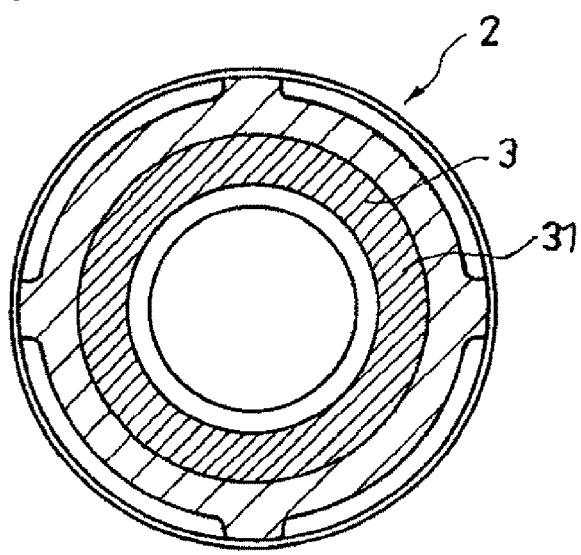
FIG. 7 is a cross-sectional view taken along a line C-C in FIG. 5.
Figure 8:
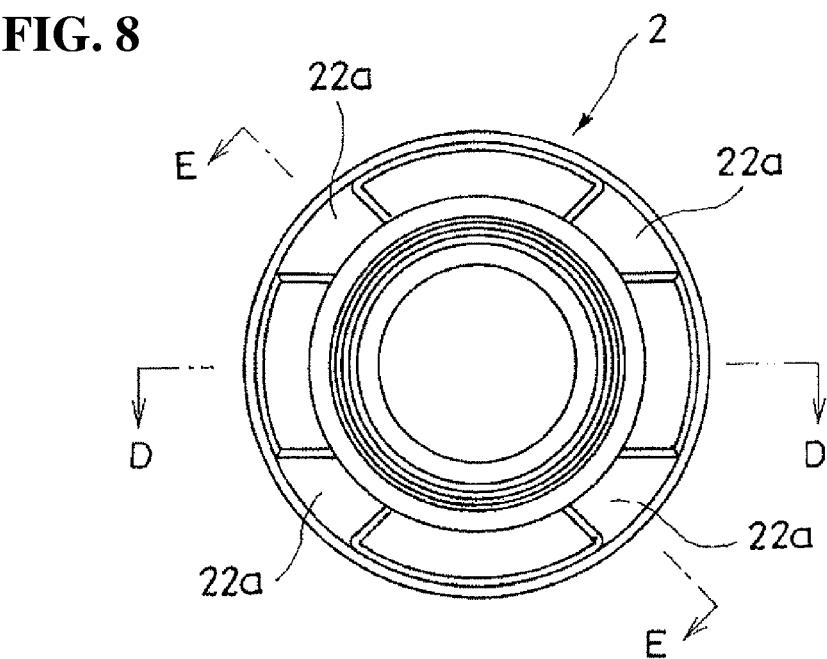
FIG. 8 is a right side view of the rotor forming the damper device.
Figure 9:
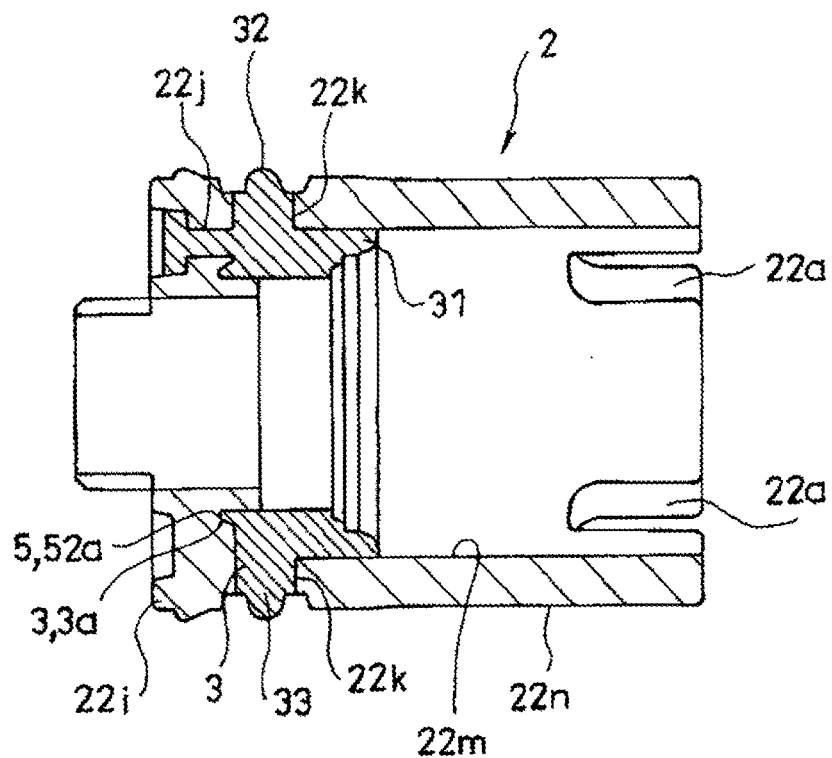
FIG. 9 is a cross-sectional view taken along a line D-D in FIG. 8.

Also, such damper device according to the embodiment comprises an annular seal portion 3 made of soft synthetic resin (see FIGS. 5, 7, and 9). Such damper device prevents leakage of the viscous fluid filled between the stator 1 and the rotor 2 by such annular seal portion 3.

In such damper device according to the embodiment, the annular seal portion 3 is provided by two-color molding or insert molding. Namely, the annular seal portion 3 is provided integrally with the rotor 2 by the two-color molding or the insert molding wherein the rotor 2 is an insert object. Thereby, in the damper device according to the embodiment, the annular seal portion 3 is integrated with the rotor 2 to become one portion thereof, so that the number of components of the damper device is minimized. Also, when the damper device is assembled, there is no need for a set of the annular seal portion 3.

Also, the annular seal portion 3 is provided with a projecting portion 3a in a rotating shaft line x (see FIG. 3) of the rotor 2 at the molding thereof. The rotor 2 is provided with a depression 5 for providing the projecting portion 3a in the annular seal portion 3 at a time of molding the annular seal portion 3 (see FIG. 9). Thereby, in the damper device according to the embodiment, the annular seal portion 3 is firmly integrated with the rotor 2 such that the projecting portion 3a in a rotating shaft direction of the rotor 2 is fitted to the depression 5. Also, as in a case wherein such annular seal portion 3 is a simple ring-shaped portion, at a time of the assembly, there are prevented inconveniences such that the ring-shaped portion is twisted and the like so as to make such assembly difficult to be smoothly performed.

Figure 3:
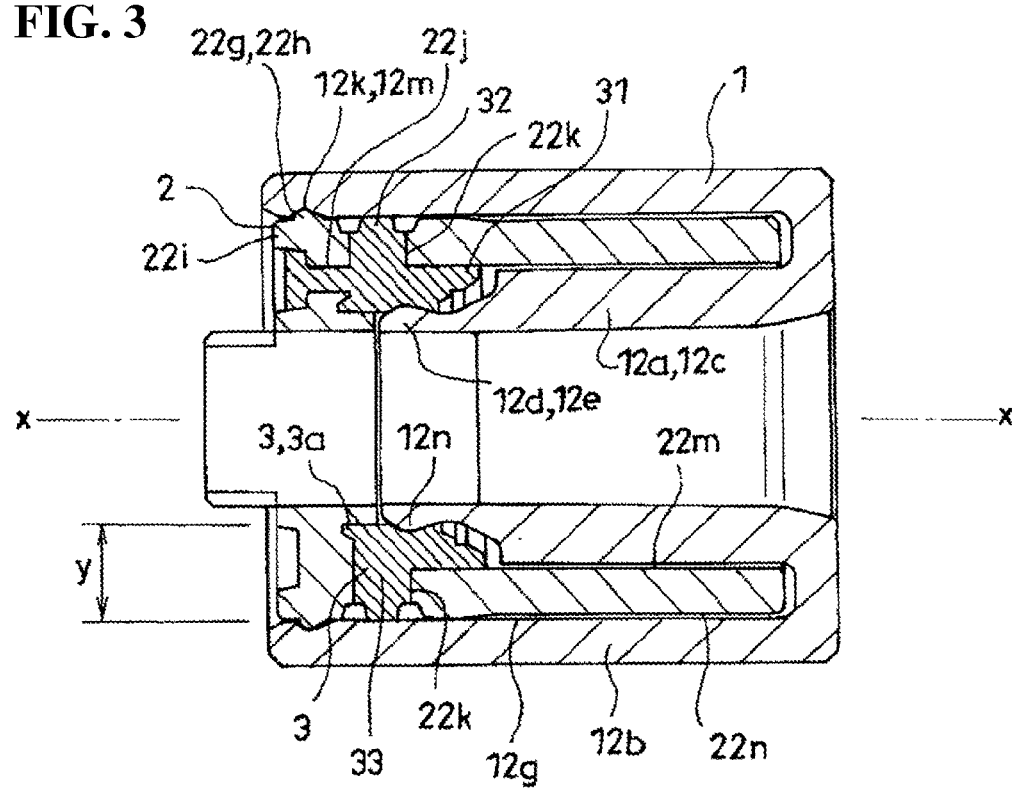
FIG. 3 is a cross-sectional structural view of the damper device taken along a line A-A in FIG. 1.
Figure 4:
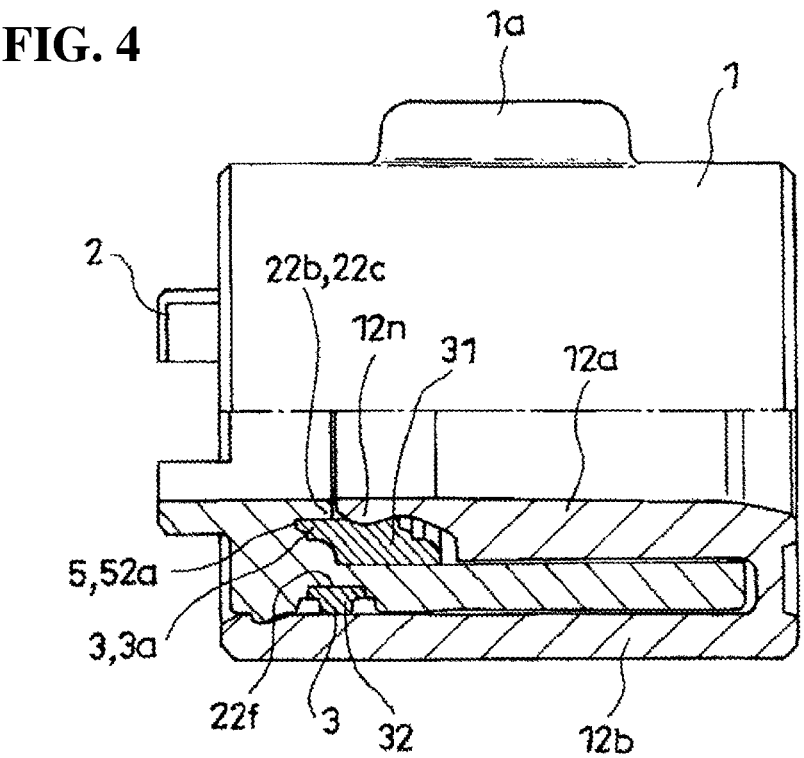
FIG. 4 is a front view showing the damper device with one part broken, and shows a cross section at a position different from FIG. 3.

Also, in the embodiment, the stator 1 includes an annular space 12g where the viscous fluid is filled, and a main member portion of the rotor 2 can be housed in the annular space 12g (see FIG. 3). Here, the annular seal portion 3 has a structure provided with an outside annular portion 32 provided in an outer circumferential portion 22n of the rotor 2; an inside annular portion 31 provided in an inner circumferential portion 22m of the rotor 2; and a connection portion 33 therebetween.

The rotor 2 has a cylindrical shape wherein both cylinder ends are open. In one cylinder end of the rotor 2, there are formed four notched portions 22a opening an approximately equal interval between adjacent notched portions 22a in a direction around the rotating shaft line x (see FIG. 3) of the rotor 2 (see FIGS. 8 to 10). In the other cylinder end side of the rotor 2, there is formed an inner flange portion 22b making an inner diameter of the rotor 2 smaller in the other cylinder end side (see FIG. 13). Due to the inner flange portion 22b, the rotor 2 is provided with a circumferential step surface 22c in the other cylinder end side (see FIGS. 12 and 13). The rotor 2 is housed in the later-described annular space 12g of the stator 1 from one cylinder end side thereof. In the other cylinder end of the rotor 2, there are formed convex portions 22e respectively on both sides sandwiching a cylinder opening 22d thereof (see FIG. 1).

Figure 15:
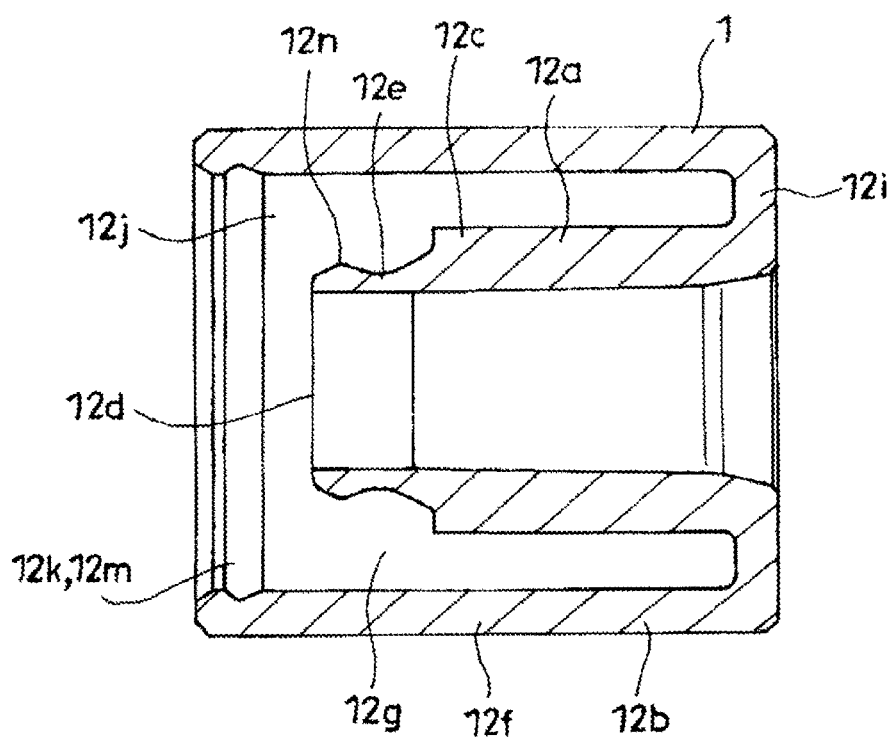
FIG. 15 is a cross-sectional view taken along a line F-F in FIG. 14.

The stator 1 includes an inside circumferential wall 12c and an outside circumferential wall 12f by an inner cylinder portion 12a and an outer cylinder portion 12b both forming a cylindrical shape to form the annular space 12g therebetween (see FIG. 15). Also, in one portion of an outer face of the outside circumferential wall 12f, there is included a rib 12h extending along a cylinder axis direction (see FIG. 1).

In an illustrated example, the rotor 2 is attached to one object by fitting the convex portions 22e to concave portions (not shown in the drawings) formed in one object, and turns or relatively turns together with one object accompanied by turning or relative turning of one object. On the other hand, the stator 1 is integrated with the other object side by fitting the rib 12h to a concave portion (not shown in the drawings) formed in the other object. Namely, in the illustrated example, the convex portions 22e of the rotor 2 function as the attachment portion 2a to one object, and the rib 12h of the stator 1 functions as the attachment portion 1a to the other object.

The stator 1 includes the inside circumferential wall 12c; the outside circumferential wall 12f; and a bottom wall 12i, and the aforementioned walls 12c, 12f, and 12i provide the bottomed annular space 12g in which the rotor 2 can be housed to be rotatable or relatively rotatable from an opening end side thereof through an introduction opening 12j opposite to the bottom wall 12i side (see FIG. 15). The bottom wall 12i is formed by a bottom plate extending between one cylinder end of the inner cylinder portion 12a and one cylinder end of the outer cylinder portion 12b. The viscous fluid which is omitted in the drawings is filled in such annular space 12g to impart the resistance to the rotation or the relative rotation of the rotor 2 accompanied by a movement or a relative movement of the one object. As for such viscous fluid, typically, a silicone oil or grease oil can be used. Namely, a gap slightly larger than a thickness of the rotor 2 is formed between the outside circumferential wall 12f and the inside circumferential wall 12c.

Figure 12:
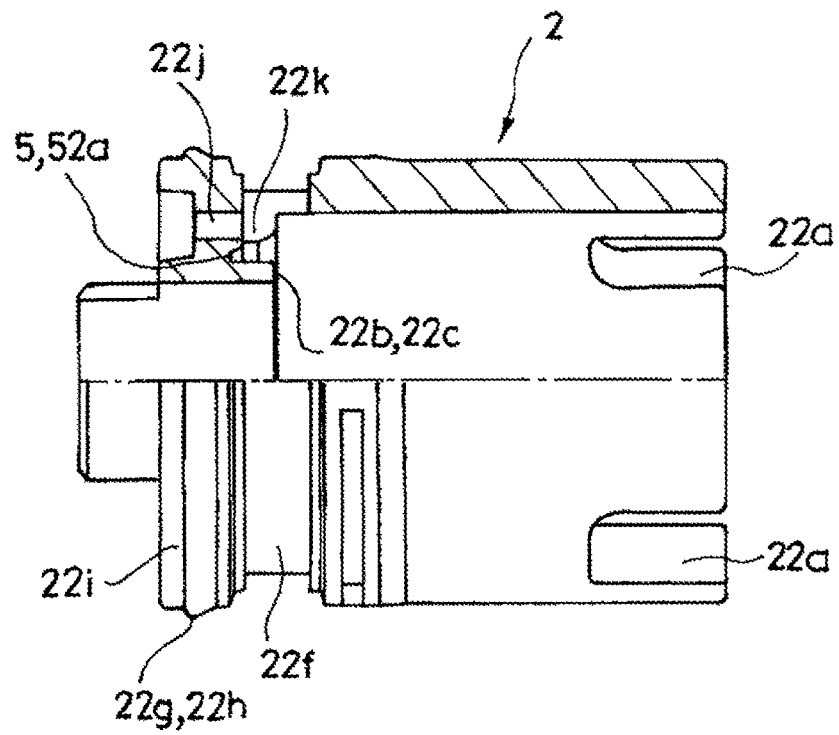
FIG. 12 is a cross-sectional view of the rotor forming the damper device, and shows the rotor by omitting the annular seal portion.
Figure 13:
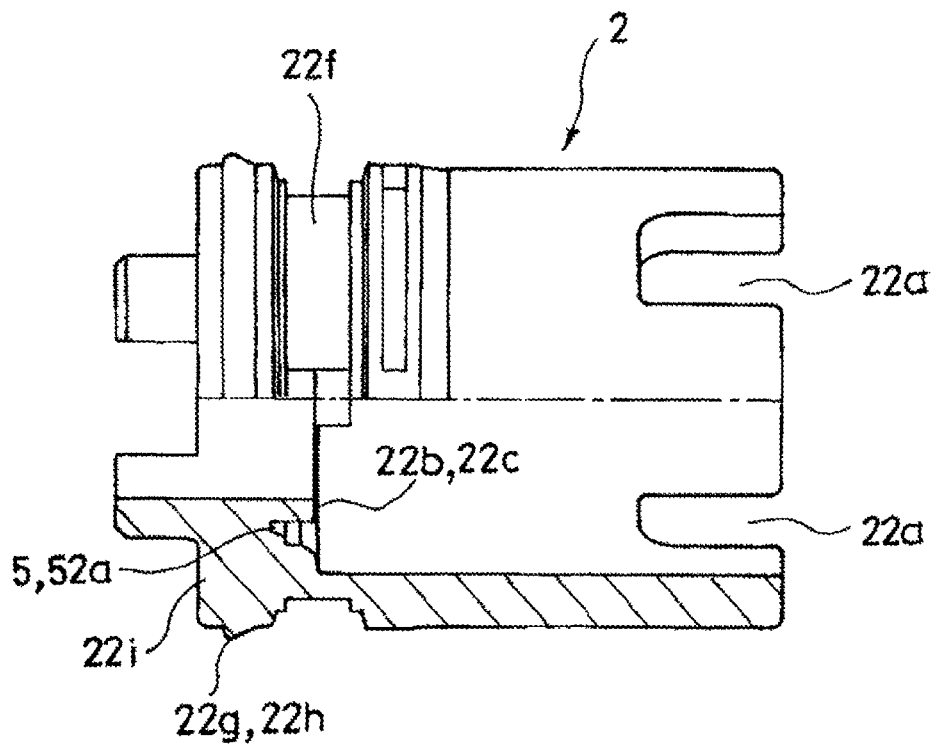
FIG. 13 is a cross-sectional view of the rotor forming the damper device with one part broken, and shows the rotor by omitting the annular seal portion.
Figure 14:
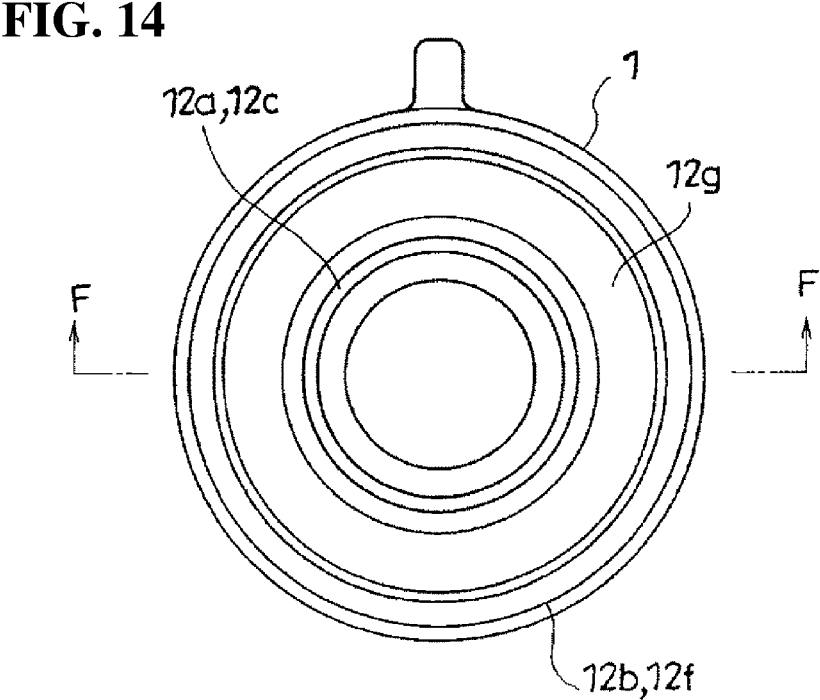
FIG. 14 is a left side view of the stator forming the damper device.

In the other cylinder end side of the rotor 2, and the outer circumferential portion 22n of the rotor 2, there is formed a circumferential groove 22f in such a way as to slightly open a gap between the circumferential groove 22f and the other cylinder end (See FIGS. 12 and 13). Also, between the other cylinder end of the rotor 2 and the circumferential groove 22f, there is formed an engaging portion 22g engaging an engaged portion 12k formed in an introduction opening 12j side in the outside circumferential wall 12f of the stator 1 at a position wherein the rotor 2 is completely entered into the annular space 12g of the stator 1 in the outer circumferential portion 22n of the rotor 2 (see FIG. 12). Such engaging portion 22g is formed as a circumferential convex portion 22h (see FIG. 12). Also, such engaged portion 12k is formed as a circumferential concave portion 12m formed in an inner face on the introduction opening 12j side of the outer cylinder portion 12b of the stator 1. When the rotor 2 is housed into the stator 1 as mentioned above, the other cylinder end of the outer cylinder portion 12b abuts against the circumferential convex portion 22h, and mainly the other cylinder end side of the outer cylinder portion 12b is pressed to elastically expand outward so as to allow the rotor 2 to be housed into the stator 1. Due to an elastic return at an end position when the rotor 2 is housed into the stator 1, the circumferential convex portion 22h enters into the circumferential concave portion 12m, thereby maintaining the aforementioned combined state between the rotor 2 and the stator 1. In the embodiment, the other cylinder end of the rotor 2 functions as a cap portion 22i closing the introduction opening 12j of the stator 1, and the portions except for the cap portion 22i function as the main member portion of the rotor 2 (see FIG. 3).

In the circumferential step surface 22c, there is formed a circumferential concave portion 52a functioning as the aforementioned depression 5 (see FIG. 13). In the cap portion 22i of the rotor 2, there is formed a first through hole 22j in a lateral side of the cylinder opening 22d (see FIG. 12). The first through hole 22j connects between an outside of the rotor 2 and a portion which is between the circumferential concave portion 52a in such circumferential step surface 22c, and the inner circumferential portion 22m of the rotor 2. Also, in a lateral portion on a cap portion 22i side of the rotor 2, there is formed a second through hole 22k communicating the inside and outside of the rotor 2 (see FIG. 12). The second through hole 22k is formed respectively on both sides in a diametrical direction of the rotor 2, and leads to a groove bottom of the circumferential groove 22f.

In the embodiment, first, soft synthetic resin forming the annular seal portion 3 is led through the first through hole 22j so as to form the inside annular portion 31 in the inner circumferential portion 22m of the rotor 2. Also, secondly, the soft synthetic resin is led to an outer circumferential portion 22n side of the rotor 2 through the second through hole 22k so as to form the outside annular portion 32 in the outer circumferential portion 22n. The connection portion 33 is formed inside such second through hole 22k such that the outside annular portion 32 and the inside annular portion 31 are connected by the connection portion 33 respectively on both sides in a diametrical direction of the annular seal portion 3.

Figure 10:
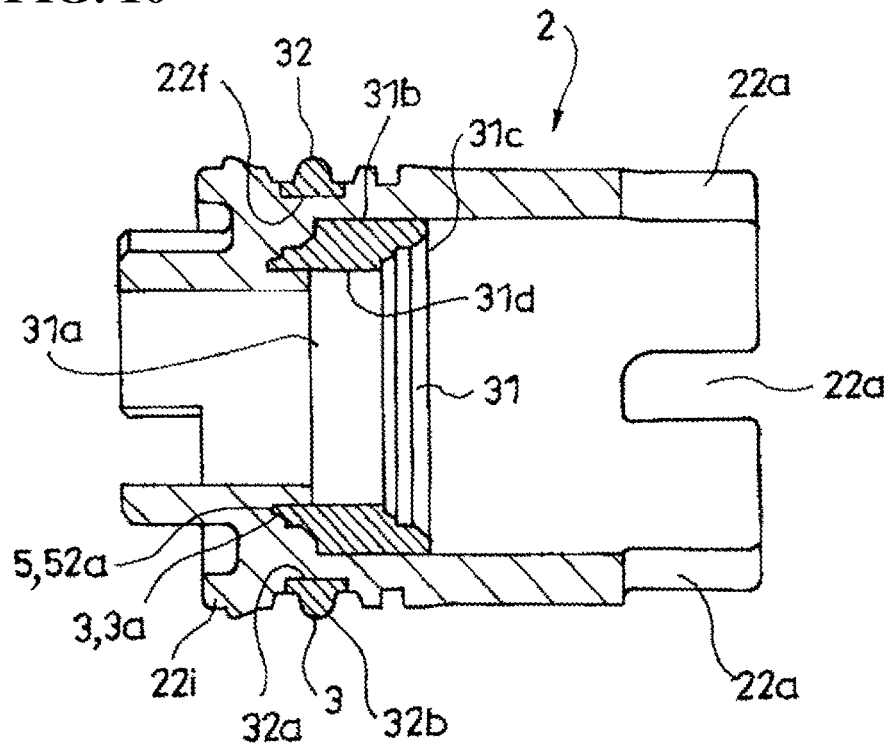
FIG. 10 is a cross-sectional view taken along a line E-E in FIG. 8.
Figure 11:
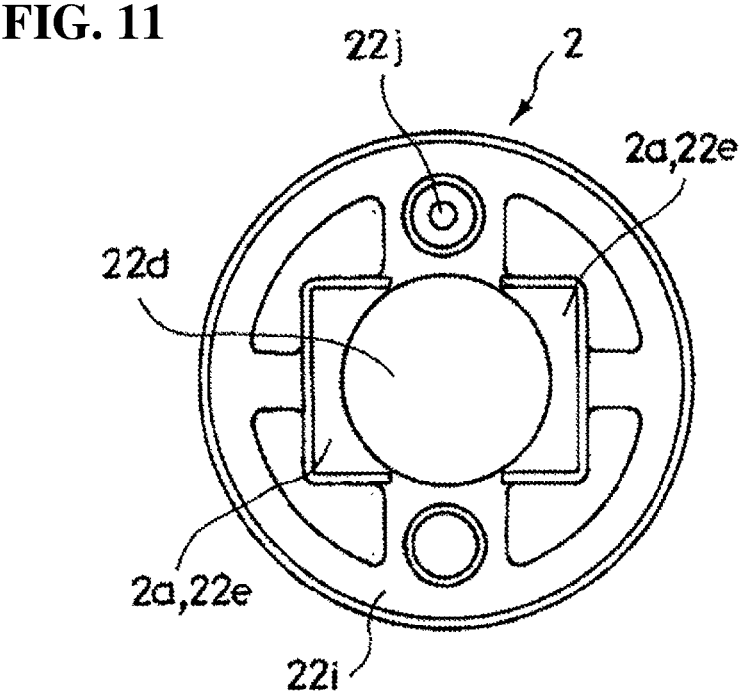
FIG. 11 is a left side view of the rotor forming the damper device, and shows the rotor by omitting a description of an annular seal portion.

As shown in FIG. 10, the inside annular portion 31 has a short cylindrical shape wherein one end 31a positioned in the cap portion 22i side is firmly attached to the circumferential step surface 22c, and an outer circumferential face 31b thereof is firmly attached to the inner circumferential portion 22m of the rotor 2. In one end 31a of the inside annular portion 31, there is provided the projecting portion 3a in a rotating axis line x direction of the rotor 2 circumferentially by the circumferential concaved portion 52a. In the other end 31c side of the inside annular portion 31, an inner circumferential face 31d of the inside annular portion 31 is formed such that a thickness of the inside annular portion 31 becomes thinner stepwise toward the other end 31c. The rest of the inner circumferential face 31d of the inside annular portion 31 has the same face circumferentially as an inner circumferential face of the projecting portion 3a, and is substantially parallel to the rotating axis line x (see FIG. 3) of the rotor 2.

The outside annular portion 32 has a structure provided with a base portion 32a having a circumferential strip shape which fills the circumferential groove 22f, and a circumferential rising portion 32b integrated with the base portion 32a and having a semicircular-arc cross-sectional shape.

The connection portion 33 is formed by the second through hole 22k, and the inside annular portion 31 and the outside annular portion 32 are connected by such connection portion 33 respectively on both sides in the diametrical direction of the annular seal portion 3.

In the embodiment, when the main member portion of the rotor 2 enters into the stator 1 up to a position wherein an end portion 12d positioned in the introduction opening 12j side in the inner cylindrical portion 12a of the stator 1 abuts against the circumferential step surface 22c of the rotor 2, the engaging portion 22g and the engaged portion 12k are engaged, and the inner circumferential face 31d of the inside annular portion 31 seals between the inside circumferential wall 12c which is an inner face of the inner cylindrical portion 12a of the stator 1, and the inner circumferential portion 22m of the rotor 2. Also, the circumferential rising portion 32b of the outside annular portion 32 seals between the outside circumferential wall 12f which is an outer face of the outer cylindrical portion 12b of the stator 1, and the outer circumferential portion 22n of the rotor 2. In the embodiment, the inner cylindrical portion 12a of the stator 1 and an inner side of the inner flange portion 22b of the rotor 2 are formed to communicate so that a shaft can be inserted to pass through therebetween. Such inside annular portion 31 and outside annular portion 32 are integrated by the connection portion 33 passing through the rotor 2 (see FIG. 3), so that at the time of the assembly of the stator 1 and the rotor 2, such assembly can be smoothly performed without twisting or misaligning the inside annular portion 31 and the outside annular portion 32.

Also, in the embodiment, in the inside circumferential wall 12c forming the annular space 12g of the stator 1, there is formed an annular projecting portion 12n abutting against the inside annular portion 31 of the annular seal portion 3 at a position forming the connection portion 33. In the illustrated example, the inner cylindrical portion 12a opens the end portion 12d abutting against the circumferential step surface 22c, and the end portion 12d side has a thin portion 12e allowing an outer diameter in the end portion side to be smaller than that of the rest of the portions. Then, in the thin portion 12e, there is provided the annular projecting portion 12n. In a portion forming the connection portion 33, a thickness y (see FIG. 3) in the diametrical direction of the annular seal portion 3 becomes thicker than a thickness in a diametrical direction of the rest of the portions, so that in the portion forming the connection portion 33, there is substantially generated a "sink" due to shrinkage after molding; however, even if such "sink" occurs, the annular projecting portion 12n can prevent a sealing property between the inside annular portion 31 and the outside annular portion 32 in the aforementioned portion forming the connection portion 33 from declining.

Incidentally, obviously, the present invention is not limited to the embodiment explained above, and the embodiment includes all embodiments which can obtain the object of the present invention.

Incidentally, all contents of the specification, claims, drawings, and abstract of Japanese Patent Application No.

2014-018924 filed on Feb. 3, 2014 are cited in their entireties herein and are incorporated as a disclosure of the specification of the present invention.

What is claimed is:

1. A damper device, comprising a stator, a rotor, and a viscous fluid filled therebetween to impart a resistance to a rotation or a relative rotation of the rotor, and forming a braking force by the resistance,
   wherein the rotor includes an annular seal portion made of soft synthetic resin by integral molding and a plurality of through holes passing through an inside and outside of the rotor,
   the stator includes an annular space filled with the viscous fluid, and a main member of the rotor is housed in the annular space,
   the annular seal portion includes an outside annular portion provided at an outer circumferential portion of the rotor, an inside annular portion provided at an inner circumferential portion of the rotor, and a connection portion therebetween, and
   the inside annular portion and the outside annular portion are provided between one and another axial ends of the rotor, and the connection portion extends through the plurality of through holes to integrally connect the inside annular portion and the outside annular portion.

2. A damper device according to claim 1, wherein the rotor further comprises an opening extending from the one axial end of the rotor to the another axial end of the rotor.

3. A damper device according to claim 2, wherein the inside annular portion and the outside annular portion extend along the inner and outer circumferential portions of the rotor, respectively.

4. A damper device according to claim 3, wherein each of the plurality of through holes extends along a radial direction of the rotor.

5. A damper device, comprising a stator, a rotor, and a viscous fluid filled therebetween to impart a resistance to a rotation or a relative rotation of the rotor, and forming a braking force by the resistance,
   wherein the rotor includes an annular seal portion made of soft synthetic resin by integral molding,
   the stator includes an annular space filled with the viscous fluid, and a main member of the rotor is housed in the annular space,
   the annular seal portion includes an outside annular portion provided at an outer circumferential portion of the rotor, an inside annular portion provided at an inner circumferential portion of the rotor, and a connection portion therebetween, and
   an inside circumferential wall portion facing the inner circumferential portion of the rotor forming the annular space of the stator is formed with an annular projecting portion abutting against the inside annular portion of the annular seal portion at a position forming the connection portion.

* * * * *